Figure 1:
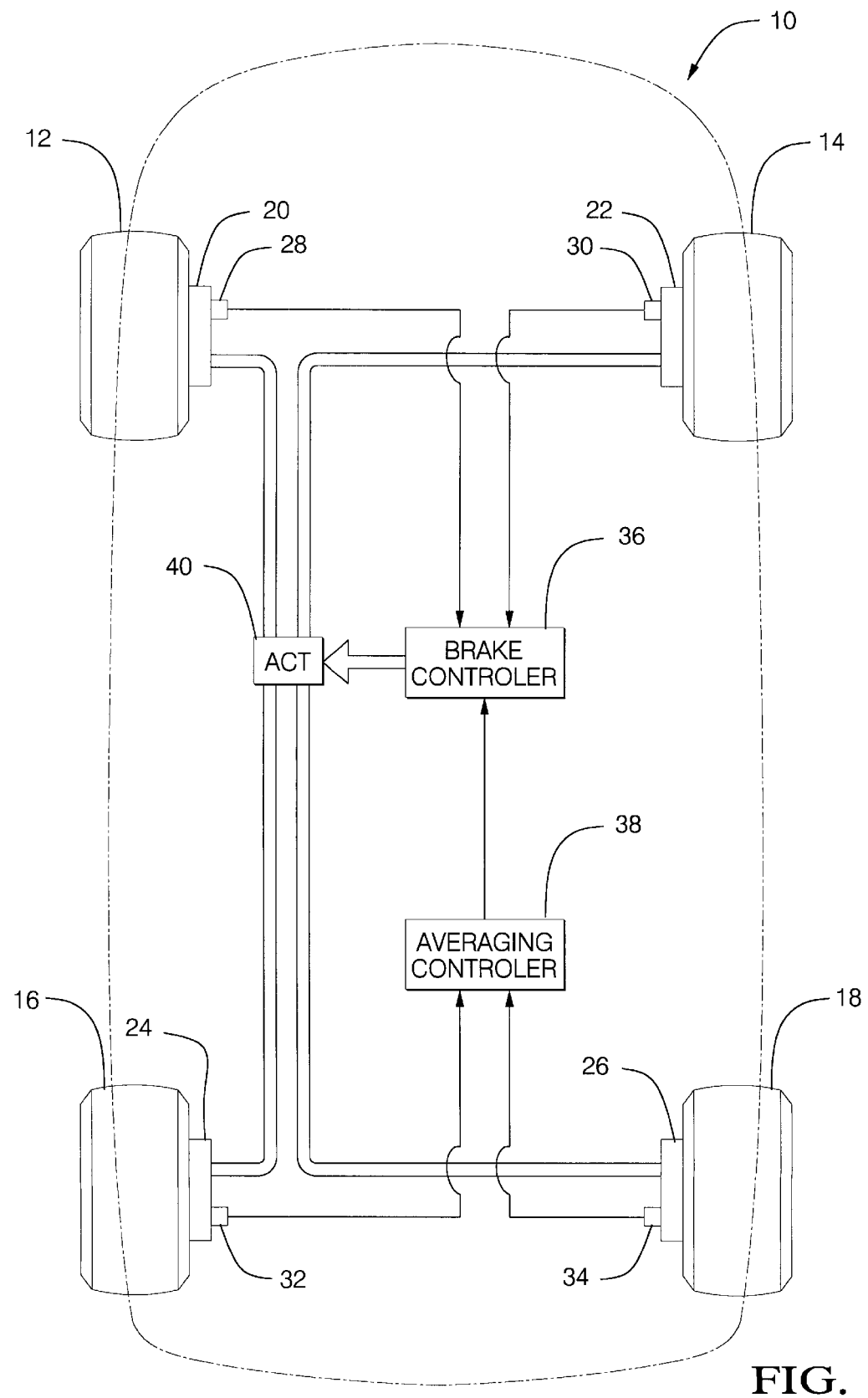

United States Patent [19]
Greenwell et al.

[11] Patent Number: 6,021,382
[45] Date of Patent: Feb. 1, 2000

[54] WHEEL SPEED AVERAGING CIRCUIT

[75] Inventors: Randall Glenn Greenwell, Ortonville; Douglas Robert Drauch, St. Clair Shores, both of Mich.

[73] Assignee: General Motors Corporation, Detroit, Mich.

[21] Appl. No.: 09/022,434

[22] Filed: Feb. 12, 1998

[51] Int. Cl.⁷ .................................................. B60T 8/66
[52] U.S. Cl. .............................. 702/148; 701/93; 701/70
[58] Field of Search .................................. 702/148, 146; 180/197, 248; 701/70, 71, 51, 82, 93; 235/61 E

[56] References Cited

U.S. PATENT DOCUMENTS

| | | | |
|---|---|---|---|
| 3,872,317 | 3/1975 | Peterson et al. | 307/10 R |
| 4,409,664 | 10/1983 | Skarvada | 364/565 |
| 4,420,814 | 12/1983 | Arikawa et al. | 364/565 |
| 4,750,125 | 6/1988 | Leppek et al. | 364/426 |
| 4,777,611 | 10/1988 | Tashio et al. | 364/565 |
| 4,977,525 | 12/1990 | Blackwell | 364/565 |
| 4,989,923 | 2/1991 | Lee et al. | 303/109 |
| 5,172,318 | 12/1992 | Meissner et al. | 364/426.02 |
| 5,231,597 | 7/1993 | Komatsu | 364/561 |
| 5,404,304 | 4/1995 | Wise et al. | 364/426.04 |
| 5,459,732 | 10/1995 | Wise et al. | 364/426.02 |
| 5,487,595 | 1/1996 | Wise et al. | 303/168 |
| 5,490,070 | 2/1996 | Kiryu et al. | 364/426.02 |
| 5,563,793 | 10/1996 | Nakaura | 364/426.04 |
| 5,586,815 | 12/1996 | Negrin | 303/143 |
| 5,618,084 | 4/1997 | Reiner | 303/3 |
| 5,631,829 | 5/1997 | Takasaki et al. | 364/424.098 |
| 5,631,837 | 5/1997 | Fukumura | 364/431.03 |
| 5,632,535 | 5/1997 | Leckevich et al. | 303/186 |
| 5,636,121 | 6/1997 | Tsuyama et al. | 364/426.01 |
| 5,740,083 | 4/1998 | Anderson et al. | 364/565 |
| 5,760,682 | 6/1998 | Liu et al. | 340/444 |
| 5,855,419 | 1/1999 | Urai et al. | 303/9.69 |

*Primary Examiner*—Patrick Assouad
*Attorney, Agent, or Firm*—Anthony Luke Simon

[57] ABSTRACT

A wheel speed averaging circuit includes a first wheel speed sensor, a second wheel speed sensor, a first analog switch having a first input coupled to the first wheel speed sensor for receiving the first sensor signal, a second analog switch having a second input coupled to the second wheel speed sensor for receiving the second sensor signal, and a microprocessor controller. The microprocessor controller determines a first duration of a first single pulse of the first sensor signal while the first analog switch is enabled and the second analog switch is disabled, selectively enables the second analog switch while disabling the first analog switch after determining the first duration, and determines a second duration of a second single pulse of the second sensor signal while the second analog switch is enabled, so that the first and second single pulses from the first and second sensor signals are alternately measured. The rear average wheel speed signal is provided responsive to the first and second durations.

2 Claims, 3 Drawing Sheets

WHEEL SPEED AVERAGING CIRCUIT

This invention relates to a wheel speed averaging circuit.

BACKGROUND OF THE INVENTION

Many vehicles include antilock brake control as a standard feature. The primary inputs to a typical antilock brake control are the wheel speed signals output by sensors that monitor the rotational velocities of the vehicle wheels. In some vehicles, the antilock brake control controls the rear wheels together and can rely on an average of the rear wheel speeds. For example, in a rear-wheel-drive or four-wheel-drive light truck in which the antilock brake control controls the rear wheels together, the average rear wheel speed may be taken from the transmission output shaft driving the rear wheels.

Light duty trucks make good candidates for electric conversion vehicles because they have plenty of room and load capacity for batteries and they are useful to many operators who could use an electric conversion vehicle. During the conversion to an electric vehicle, the internal combustion engine and drive train are removed and replaced with an electric motor and drive train. The electric drive train may be only front wheel drive. In these vehicles, there is no output shaft to drive the rear wheels, so the average rear wheel speed signal that was provided by the output shaft is no longer available.

SUMMARY OF THE INVENTION

It is an object of this invention to provide a wheel speed averaging circuit according to claim 1.

Advantageously this invention provides a wheel speed averaging circuit suitable for use in an electric conversion vehicle in which an average rear wheel speed signal is desire.

Advantageously, this invention provides the average rear wheel speed signal by adding wheel speed sensors to each of the vehicle rear wheels. The sensor output signals are input to a wheel speed averaging circuit that provides a signal to the antilock brake controller equal to the average of the two rear wheel speeds. Thus this invention allows the conversion vehicle to make use of the same antilock brake controller that was in the vehicle before the conversion and that requires an input indicative of the average speed of the two rear vehicle wheels.

Advantageously, then, according to a preferred example, this invention provides a wheel speed averaging circuit comprising: a first wheel speed sensor providing a first sensor signal indicative of a first rotational velocity of a first wheel; a second wheel speed sensor providing a second sensor signal indicative of a second rotational velocity of a second wheel; a first analog switch having a first input coupled to the first wheel speed sensor for receiving the first sensor signal; a second analog switch having a second input coupled to the second wheel speed sensor for receiving the second sensor signal; a microprocessor controller coupled to first and second outputs of the first and second analog switches, respectively, wherein the microprocessor controller comprises (a) means for selectively enabling the first analog switch while disabling the second analog switch; (b) means for determining durations of first pulses of the first sensor signal while the first analog switch is enabled, (c) means for selectively enabling the second analog switch while disabling the first analog switch, (d) means for determining durations of second pulses of the second sensor signal while the second analog switch is enabled, and (e) means for providing a speed signal indicative of an average speed of the first and second wheels responsive to the sum of the first and second pulses.

BRIEF DESCRIPTION OF THE DRAWINGS

The present invention will now be described by way of example with reference to the following figures, in which:

FIG. 1 illustrates a schematic of an example implementation of this invention in a vehicle;

FIG. 2 illustrates an example wheel speed averaging circuit according to this invention; and FIG. 3 illustrates an example flow diagram of software commands performed according to this invention.

DETAILED DESCRIPTION OF THE INVENTION

Referring now to FIG. 1, the example vehicle 10 has front wheels 12, 14 and rear wheels 16, 18. Each of the wheels 12, 14, 16, 18 has an associated wheel brake 20, 22, 24, 26, respectively, and an associated wheel speed sensor 28, 30, 32, 34, respectively. The wheel speed sensors 28, 30, 32, 34 provides pulse signals that have a frequency corresponding to the rotational velocity of the corresponding wheels 12, 14, 16, 18. Brake controller 36 uses the pulse signals to determine the vehicle reference velocity information and wheel rotational velocity information in a known manner of antilock brake control.

In this example, the controller 36 needs to know the average rear wheel speed because brake controller 36 is of a known type that controls the rear wheels during antilock braking based on the average rotational velocity of the rear wheels. Thus the output signals from the rear wheel speed sensors 32, 34 are provided to the averaging controller 38, which includes a circuit for averaging the rotational velocities of the left and right rear wheels and providing that average to the brake controller 36.

During vehicle braking, the brake controller 36 uses the wheel speed inputs from sensors 28 and 30 and from averaging controller 38 in a known manner of antilock brake control to determine control commands for actuators 40. Actuators 40 respond to the commands to apply, hold or release brake pressure in the wheel brakes 20, 22, 24, 26 as the commands dictate. The actuators 40 may be any known type of antilock brake actuators. When all four brakes 20, 22, 24, 26 are hydraulic brakes, the actuators 40 may be reciprocating piston type antilock brake actuators of a known type for hydraulically releasing and applying brake pressure. The actuators 40 may also be solenoid controlled valves selectively coupling the brakes 20, 22, 24, 26 to a high pressure fluid source and a reservoir for applying and releasing brake pressure as commanded. In another example, the rear wheel brakes may be electrically actuated brakes, in which case the actuators 40 for the rear brakes are the electric actuators for those brakes.

Referring now to FIG. 2, an example wheel speed averaging circuit is shown. The sensor 32 of a known type provides a sinusoidally varying voltage signal on lines 50 and 52, which are coupled to the inputs of comparator 72. The comparator 72, along with its associated resistors 58, 60, 62, 64, 66 and 76 and capacitors 54, 56, 68, 70 and 74 provide an output signal on line 78 comprising a square wave signal of the same frequency as the signal output from sensor 32. Resistor 80 biases line 78 to the 5 volt regulated voltage supply.

The sensor 34 similarly provides a sinusoidally varying voltage signal on lines 90, 92, which are coupled to the inputs of comparator 112. The comparator 112, along with its associated resistors 98, 100, 102, 104, 108 and 114 and capacitors 94, 96, 106 and 110 provide an output signal on line 116 comprising a square wave signal of the same frequency as the signal output from sensor 34. Resistor 118 biases line 116 to the 5 volt regulated voltage supply.

Line 78 is input to analog switch 82 and line 116 is input to the analog switch 124. Both switches may be contained in a single integrated circuit package, which has an associated capacitor 126 to filter high frequency supply voltage fluctuations. Analog switch 82 is controlled by line 86 to have the opposing state of analog switch 124, which is controlled by line 120. Thus when analog switch 82 is enabled, analog switch 124 is disabled and when analog switch 82 is disabled, analog switch 124 is enabled. This control of the switches 82, 124 multiplexes the signals from sensors 32, 34 to line 88, which is coupled via resistor 124 to the RTCC input port of microprocessor 130. Capacitors 132, 134 provide high frequency filtering of line 88. Microprocessor 130 is, for example, a P1C16C54A microprocessor, commercially available from Microchip Corp. and controls lines 86 and 120 through its RA3 and RA2 outputs, respectively.

Figure 3:
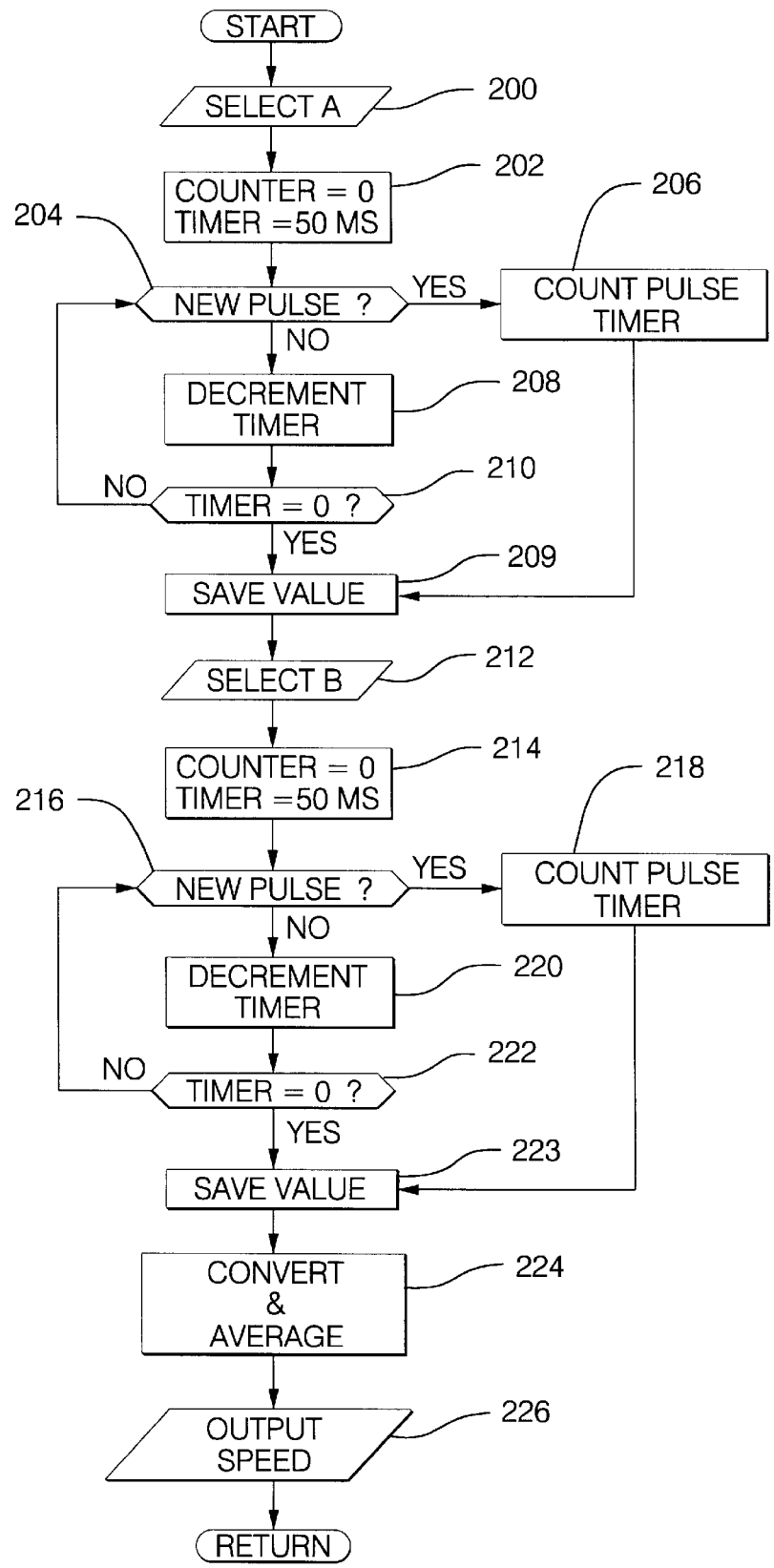

Referring now also to FIG. 3, the operation of microprocessor 130 can be understood. During braking operation, the microprocessor 130 executes a set of software commands stored in internal memory to achieve the following steps. At step 200, the microprocessor enables the analog switch 82 so that the signal on line 78 is coupled to line 88 and input to microprocessor 130. In this state, the microprocessor is monitoring the left rear wheel speed sensor 32. At step 202, the variable COUNTER is set to zero and the variable TIMER is set to a value corresponding to a predetermined time period, for example, 50 ms. Block 204 determines whether a new pulse has been received at the RTCC input and, if so, block 206 increments COUNTER for the duration of the pulse, that is, the COUNTER counts the duration of the pulse. Otherwise the routine proceeds straight to block 208 where the value TIMER is decremented.

Block 210 compares TIMER to zero. If TIMER is not equal to zero, then the routine returns to block 204. In this manner, the system monitors for a pulse during a 50 ms time interval and, if a pulse is detected, the value COUNTER reflects the number of time intervals that occur during the pulse. Block 209 stores the value of the pulse time period as determined for the left rear wheel speed sensor 32.

After either a pulse time has been determined or the 50 ms maximum time interval (signified by TIMER equal to zero), block 212 selects or enables analog switch 124 and deselects or disables analog switch 82. Block 214 resets TIMER and COUNTER and then blocks 216, 218, 220, 222 and 223 perform the same steps as blocks 204, 206, 208, 209 and 210 above. Block 223 stores the value of the pulse time period as determined for the right wheel speed sensor 34.

Block 224 converts the pulse time values that were saved in blocks 209 and 223 to vehicle speed values and averages the two values into a single average rear wheel speed. Then block 226 outputs the vehicle speed value via parallel bus 138 to microprocessor 140. Resistors 142 bias bus 138 to ground.

Microprocessor 130 performs the steps shown in FIG. 3 continuously as long as the brakes are active and at all other times during which it is desired to know the average speed of the rear vehicle wheels.

Figure 2:
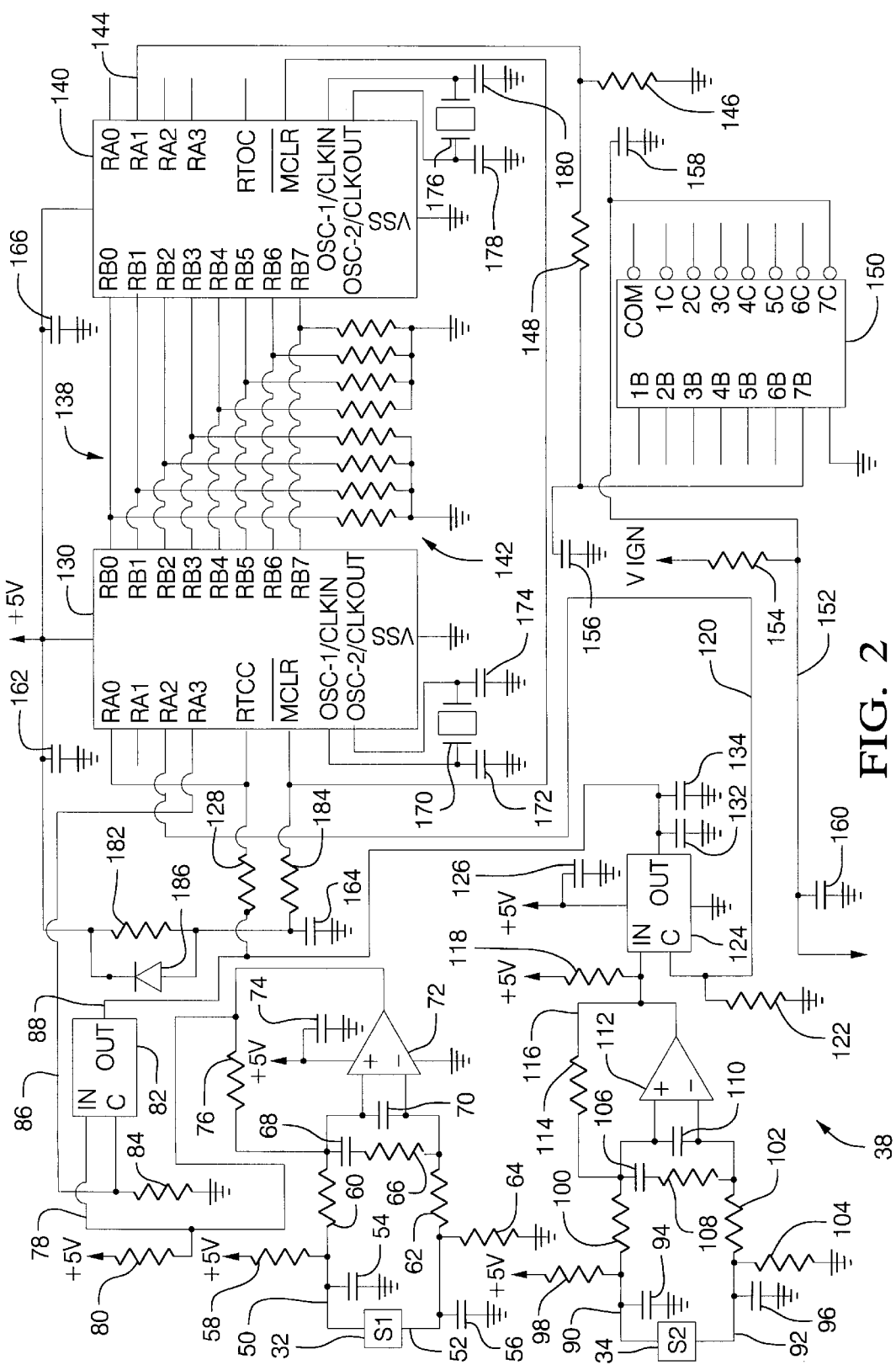

In FIG. 2, buss 138 is biased to ground via resistors 142. Microprocessor 140 may be of the same type as microprocessor 130.

Microprocessor 140 converts the parallel speed signal on bus 138 to a series signal and outputs the signal on bus 144, which is biased low by resistor 146. Resistor 148 couples bus 144 to bus driver circuit 150, which outputs the serial data signal on bus 152, which resistor 154 biases to the vehicle ignition voltage. Capacitors 158, 160, 162, 164 and 166 perform high frequency filtering of the various lines. Crystal 170 and capacitors 172, 174 regulate the clock frequency of microprocessor 130 and crystal 176 and capacitors 178 and 180 regulate the clock frequency of microprocessor 140. Resistors 182 and 184 and diode 186 bias high the MCLR(BAR) inputs of microprocessors 130, 140.

We claim:

1. A wheel speed averaging circuit comprising:
    a first wheel speed sensor providing a first sensor signal indicative of a first rotational velocity of a first wheel;
    a second wheel speed sensor providing a second sensor signal indicative of a second rotational velocity of a second wheel;
    a first analog switch having a first input coupled to the first wheel speed sensor for receiving the first sensor signal;
    a second analog switch having a second input coupled to the second wheel speed sensor for receiving the second sensor signal;
    a microprocessor controller coupled to first and second outputs of the first and second analog switches, respectively, wherein the microprocessor controller comprises
        (a) means for determining a first duration of a first single pulse of the first sensor signal while the first analog switch is enabled and the second analog switch is disabled,
        (b) means for selectively enabling the second analog switch while disabling the first analog switch after determining the first duration of the first single pulse,
        (c) means for determining a second duration of a second single pulse of the second sensor signal while the second analog switch is enabled,
        (d) means for selectively enabling the first analog switch while disabling the second analog switch after determining the second duration of the second single pulse, wherein the first and second single pulses from the first and second sensor signals are alternately measured, and
        (e) means for providing a speed signal indicative of an average speed of the first and second wheels responsive to the first and second durations.

2. A wheel speed averaging circuit according to claim 1, wherein the first and second analog switches are enabled for equal time periods unless first or second pulses are received.

* * * * *